(12) United States Patent
Yamaguchi et al.

(10) Patent No.: US 12,367,695 B2
(45) Date of Patent: Jul. 22, 2025

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Akinobu Yamaguchi, Kanagawa (JP); Junichi Shimizu, Kanagawa (JP); Kunihiko Kobayashi, Kanagawa (JP); Shintaro Adachi, Kanagawa (JP); Shinya Nakamura, Kanagawa (JP); Masanori Yoshizuka, Kanagawa (JP); Akane Abe, Kanagawa (JP); Naomi Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 461 days.

(21) Appl. No.: 17/704,000

(22) Filed: Mar. 25, 2022

(65) Prior Publication Data
US 2023/0099764 A1   Mar. 30, 2023

(30) Foreign Application Priority Data
Sep. 24, 2021   (JP) .................................. 2021-156132

(51) Int. Cl.
G06V 30/18   (2022.01)
(52) U.S. Cl.
CPC .................................... *G06V 30/18* (2022.01)

(58) Field of Classification Search
None
See application file for complete search history.

(56) References Cited

U.S. PATENT DOCUMENTS

| | | | |
|---|---|---|---|
| 11,179,116 B2 * | 11/2021 | Lou | A61B 6/544 |
| 12,056,331 B1 * | 8/2024 | Benson | G06F 40/106 |
| 2002/0106128 A1 * | 8/2002 | Zlotnick | G06V 30/1444 |
| | | | 382/224 |
| 2006/0074907 A1 * | 4/2006 | Singhal | G06F 40/103 |
| 2006/0122947 A1 * | 6/2006 | Poulin | G07B 17/00435 |
| | | | 705/401 |
| 2018/0053045 A1 * | 2/2018 | Lorenzini | G06Q 20/209 |
| 2018/0204111 A1 * | 7/2018 | Zadeh | G06V 10/764 |

(Continued)

FOREIGN PATENT DOCUMENTS

| | | | |
|---|---|---|---|
| JP | 2001094760 A | * | 4/2001 |
| JP | 2008084186 | | 4/2008 |

*Primary Examiner* — Randolph I Chu
(74) *Attorney, Agent, or Firm* — JCIPRNET

(57) ABSTRACT

An information processing apparatus includes a processor configured to: extract attribute values for plural attributes from an optical character recognition (OCR) result for an image in accordance with an extraction rule determined in advance, and generate an extraction result in which the extracted attribute values and the respective attributes are correlated with each other; and perform control so as to associate, in accordance with an association rule for associating an attribute value for a sub attribute with a different attribute, the attribute value for the sub attribute with the different attribute included in the extraction result, the sub attribute being an attribute for which an attribute value is extracted from the image and which supplements a content for the different attribute.

14 Claims, 13 Drawing Sheets

IF COORDINATE OF [PRICE-CONSUMPTION TAX INFORMATION] IS INCLUDED IN ONE-THIRD FROM LOWER PART OF IMAGE AND ATTRIBUTE VALUE FOR [PRICE-CONSUMPTION TAX INFORMATION] INCLUDES [CONSUMPTION TAX] AND [IS NOT INCLUDED],   } CONDITION

ATTRIBUTE VALUE FOR [PRICE-TOTAL] IS RENDERED ATTRIBUTE VALUE FOR [PRICE-TOTAL-EXCL. TAX]   } ASSOCIATION INFORMATION

(56) References Cited

U.S. PATENT DOCUMENTS

| | | | |
|---|---|---|---|
| 2021/0124973 A1* | 4/2021 | Aruga | G06V 30/416 |
| 2022/0121884 A1* | 4/2022 | Zadeh | G06N 3/006 |
| 2023/0099764 A1* | 3/2023 | Yamaguchi | G06V 30/412 |
| | | | 382/229 |
| 2024/0062572 A1* | 2/2024 | Kim | G06F 40/117 |
| 2024/0331345 A1* | 10/2024 | Li | G06N 3/08 |

\* cited by examiner

WRITTEN QUOTATION

QUOTATION NO.: A1234

A CO. LTD.

WE QUOTE YOU THE FOLLOWING.

B CO. LTD.
CONTACT PERSON ○○

| SUBJECT MATTER | RE FACILITY REPLACEMENT |
|---|---|
| DELIVERY TIME | TO BE DETERMINED SEPARATELY |
| DELIVERY LOCATION | PLEASE SPECIFY |
| TERMS OF PAYMENT | AS PER BASIC AGREEMENT |
| VALID UNTIL | AUGUST 31, 2021 |

| TOTAL PRICE | ¥400,000 |
|---|---|

| MERCHANDISE NAME | QUANTITY | UNIT PRICE | MULTIPLICATION RATE | PRICE | CONTENT |
|---|---|---|---|---|---|
| MAINTENANCE PART | 1 | 500,000 | 80% | 400,000 | FOR ONE YEAR |
| BLANK BELOW | | | | | |
| | | | | | |
| | | | | | |
| | | | | | |
| | | | | | |
| | | | | TOTAL AMOUNT | ¥400,000 |

| REMARKS | 1) QUOTED PRICE DOES NOT INCLUDE CONSUMPTION TAX.<br>2) CONSUMPTION TAX RATE IS 10%. |
|---|---|

2A

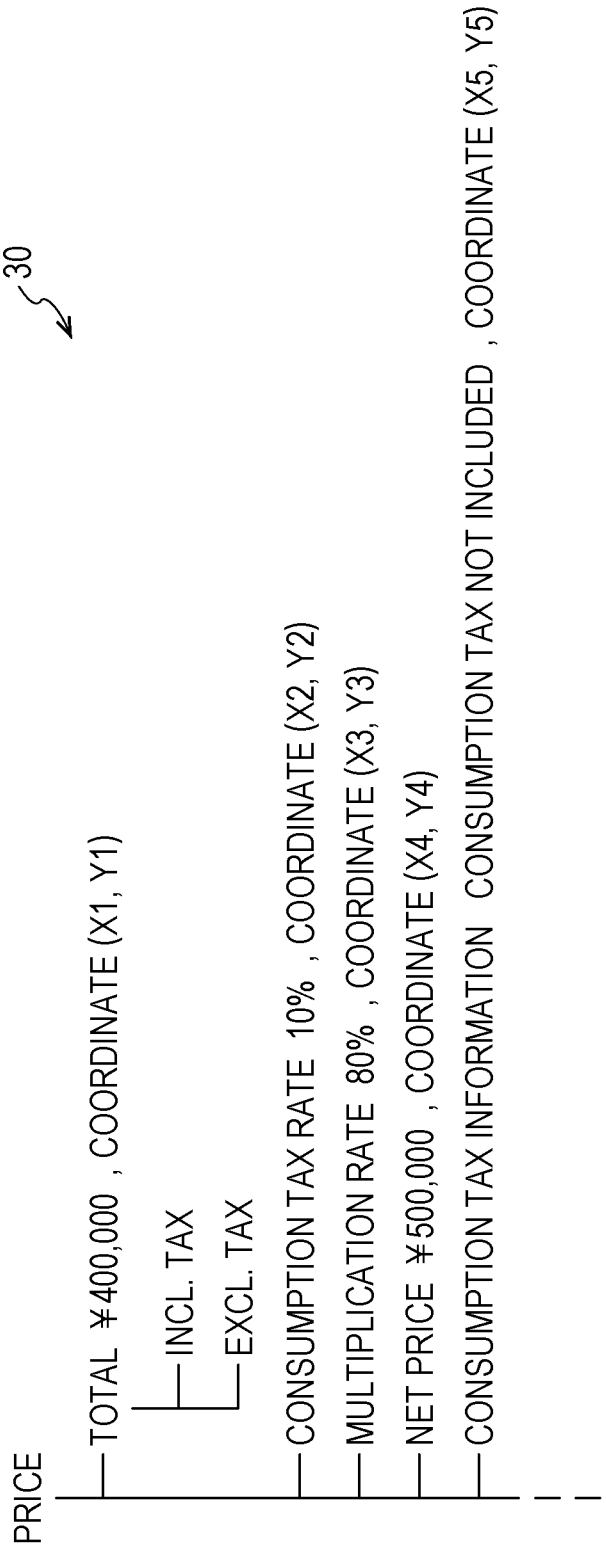

FIG. 8

```
┌─────────────────────────────────────────────────────────────────────┐
│ IF COORDINATE OF [PRICE-CONSUMPTION TAX INFORMATION] IS INCLUDED IN │ ⎫
│ ONE-THIRD FROM LOWER PART OF IMAGE AND ATTRIBUTE VALUE FOR          │ ⎬ CONDITION
│ [PRICE-CONSUMPTION TAX INFORMATION] INCLUDES [CONSUMPTION TAX] AND  │ ⎭
│ [IS NOT INCLUDED],                                                  │
│                                                                     │ ⎫ ASSOCIATION
│ ATTRIBUTE VALUE FOR [PRICE-TOTAL] IS RENDERED ATTRIBUTE VALUE FOR   │ ⎬ INFORMATION
│ [PRICE-TOTAL-EXCL. TAX]                                             │ ⎭
└─────────────────────────────────────────────────────────────────────┘
                                  19
```

BILLING STATEMENT

DATE OF ISSUE: JUNE 20, 2021

C RESTAURANT

AMOUNT BILLED  14,040 YEN

| DATE | DESCRIPTION | CLASSIFICATION | TAX-INCLUDED PRICE |
|---|---|---|---|
| 05/12/2021 | FOOD | * | 3,240 |
| 05/14/2021 | STATIONERY |  | 2,200 |
| 05/17/2021 | FOOD | * | 5,400 |
| 05/23/2021 | SHOPPING BAGS |  | 3,300 |
|  | TOTAL || 14,140 |
|  | TOTAL WITH 8% TAX RATE || 8,640 |
|  | TOTAL WITH 10% TAX RATE || 5,500 |

ASTERISK (*) INDICATES MERCHANDISE TO BE SUBJECTED TO REDUCED TAX RATE (8%).

FIRST ASSOCIATION RULE

IF COORDINATE OF [PRICE−CONSUMPTION TAX INFORMATION] IS INCLUDED IN ONE-THIRD FROM LOWER PART OF IMAGE, ATTRIBUTE VALUE FOR [PRICE−CONSUMPTION TAX INFORMATION] INCLUDES "*" AND "REDUCED TAX RATE", AND [PRICE−SUBTOTAL (N)−CLASSIFICATION] INCLUDES "*", } CONDITION

[PRICE−SUBTOTAL (N)−CONSUMPTION TAX RATE] IS RENDERED "8%". } ASSOCIATION INFORMATION

19A

SECOND ASSOCIATION RULE

IF COORDINATE OF [PRICE−CONSUMPTION TAX INFORMATION] IS INCLUDED IN ONE-THIRD FROM LOWER PART OF IMAGE, ATTRIBUTE VALUE FOR [PRICE−CONSUMPTION TAX INFORMATION] INCLUDES "*" AND "REDUCED TAX RATE", AND [PRICE−SUBTOTAL (N)−CLASSIFICATION] DOES NOT INCLUDE "*", } CONDITION

[PRICE−SUBTOTAL (N)−CONSUMPTION TAX RATE] IS RENDERED "10%". } ASSOCIATION INFORMATION

```
PRICE ─┬─ SUBTOTAL (1) ─┬─ INCL. TAX ¥3,240 , COORDINATE (X6, Y6)
       │                ├─ EXCL. TAX
       │                ├─ CLASSIFICATION * , COORDINATE (X7, Y7)
       │                └─ CONSUMPTION TAX RATE 8%
       ├─ SUBTOTAL (2) ─┬─ INCL. TAX ¥2,200 , COORDINATE (X8, Y8)
       │                ├─ EXCL. TAX
       │                ├─ CLASSIFICATION
       │                └─ CONSUMPTION TAX RATE 10%
       ├─ SUBTOTAL (3)
       │        ...
       └─ CONSUMPTION TAX INFORMATION  ASTERISK (*) INDICATES MERCHANDISE TO BE SUBJECTED TO REDUCED TAX RATE (8%). , COORDINATE (X9, Y9)
```

```
PRICE ─┬─ SUBTOTAL (1) ─┬─ INCL. TAX ¥3,240 , COORDINATE (X6, Y6)
       │                ├─ EXCL. TAX ¥3,000
       │                ├─ CLASSIFICATION * , COORDINATE (X7, Y7)
       │                └─ CONSUMPTION TAX RATE  8%
       ├─ SUBTOTAL (2) ─┬─ INCL. TAX ¥2,200 , COORDINATE (X8, Y8)
       │                ├─ EXCL. TAX ¥2,000
       │                ├─ CLASSIFICATION
       │                └─ CONSUMPTION TAX RATE  10%
       ├─ SUBTOTAL (3) ─── ...
       └─ CONSUMPTION TAX INFORMATION  ASTERISK (*) INDICATES MERCHANDISE TO BE SUBJECTED TO REDUCED TAX RATE (8%). , COORDINATE (X9, Y9)
```

32

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-156132 filed Sep. 24, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 2008-84186 discloses an image processing system that includes: an input unit that is used to input a document image that includes a plurality of regions including a character string; a dividing unit that divides the document image input using the input unit into the regions; a recognition unit that recognizes a character string from the document image input using the input unit; a determination unit that determines whether or not the character string recognized by the recognition unit for each of the regions obtained through the dividing by the dividing unit is included in a character string determined for each region and stored in advance; and a conversion unit that converts, in the case where it is determined by the determination unit that the character string recognized by the recognition unit is included in a character string determined for each region and stored in advance, the character string recognized by the recognition unit into a particular character string corresponding to the character string determined for each region and stored in advance.

SUMMARY

A key-value extraction method and a character pattern extraction method are known as extraction techniques to extract an attribute value related to a particular attribute from an image that has been subjected to an optical character recognition (OCR) process.

With these extraction methods, however, supplementary information that indicates what content is represented by the attribute value extracted by these extraction methods may not be obtained if a character string that supplements the content for an attribute is present at a position that is different from a position specified in advance. Thus, there occasionally arises a situation in which it is difficult to make use of the attribute value extraction result in later processes compared to a case where an attribute value for a specified attribute is extracted from an image together with supplementary information.

Aspects of non-limiting embodiments of the present disclosure relate to providing an information processing apparatus and a non-transitory computer readable medium that make it possible to associate a particular attribute with an attribute value for a sub attribute, which supplements the content for a particular attribute, later even in the case where the attribute value for the sub attribute may not be acquired from an image together in association with an attribute value for the attribute.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: extract attribute values for plural attributes from an optical character recognition (OCR) result for an image in accordance with an extraction rule determined in advance, and generate an extraction result in which the extracted attribute values and the respective attributes are correlated with each other; and perform control so as to associate, in accordance with an association rule for associating an attribute value for a sub attribute with a different attribute, the attribute value for the sub attribute with the different attribute included in the extraction result, the sub attribute being an attribute for which an attribute value is extracted from the image and which supplements a content for the different attribute.

BRIEF DESCRIPTION OF THE DRAWINGS

An exemplary embodiment of the present disclosure will be described in detail based on the following figures, wherein:

FIG. 5 illustrates an example of a quotation image;

FIG. 7 illustrates an example of the result of extraction of attribute values from an OCR result for a quotation;

FIG. 8 illustrates an example of an association rule to be applied to a quotation;

FIG. 11 illustrates an example of an image of an invoice;

FIG. 13 illustrates an example of an association rule to be applied to an invoice;

FIG. 14 illustrates an example of the result of extraction of attribute values in an invoice in which attributes have been associated with each other; and FIG. 15 illustrates an example of the result of extraction of attribute values in an invoice in which attribute values for associated sub attributes have been set.

DETAILED DESCRIPTION

Figure 1:
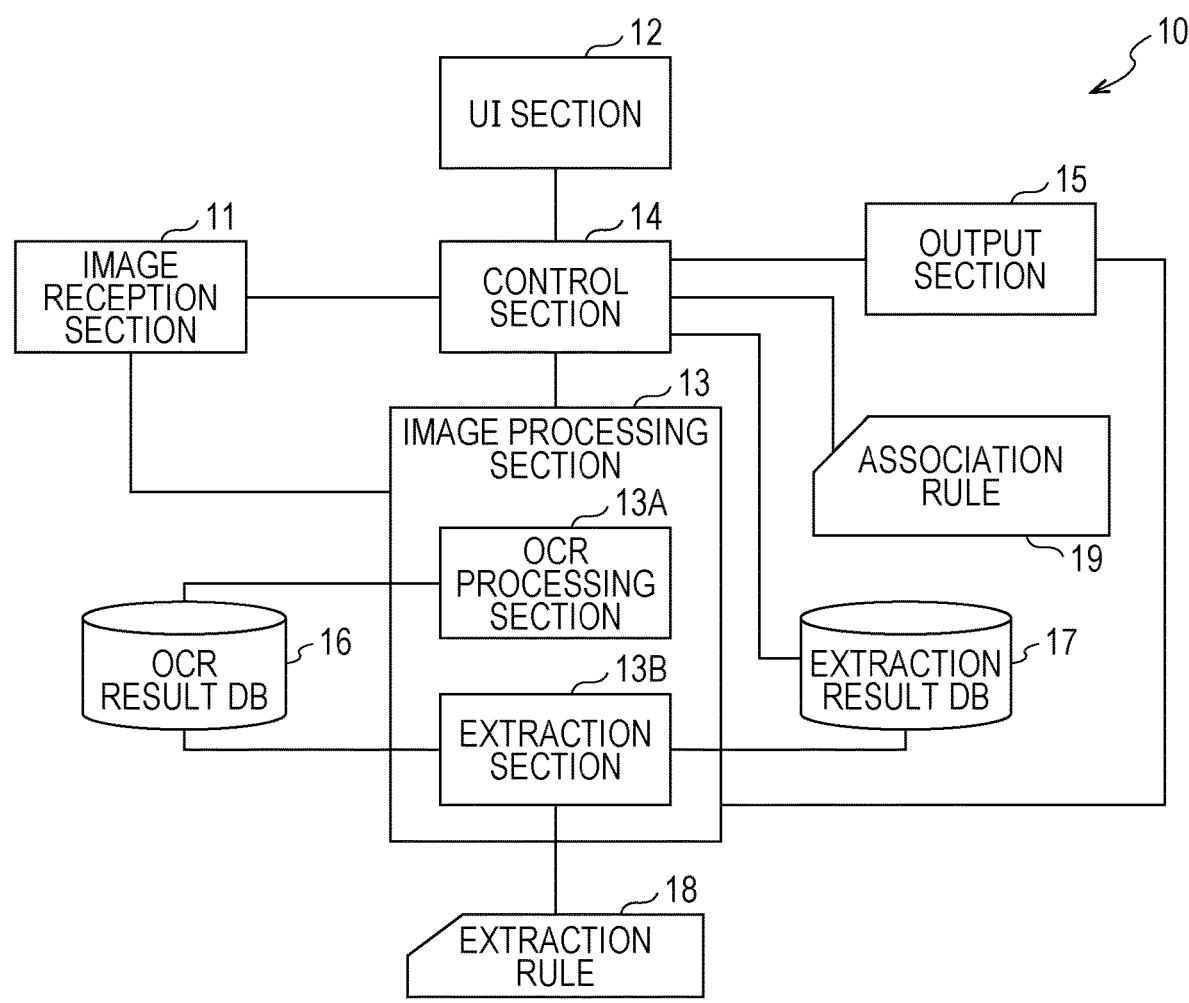
FIG. 1 is a block diagram illustrating an example of the functional configuration of an information processing apparatus.

An exemplary embodiment of the present disclosure will be described below with reference to the drawings. Like constituent elements and like processes are denoted by like reference numerals throughout the drawings to omit redundant description.

FIG. 1 is a block diagram illustrating an example of the functional configuration of an information processing apparatus 10 that extracts attribute values for attributes determined in advance from an image 2 generated by optically reading a document formed on a recording medium such as paper, for example.

The type of an imaged document from which attribute values are to be extracted by the information processing apparatus 10 is not limited, and the document may be any type of document that includes characters, such as billing statements, quotations, forms, written contracts, and design drawings, for example. That is, the image 2 from which attribute values are to be extracted by the information processing apparatus 10 includes an image 2 of various types of documents in which any information is written using characters. As a matter of course, the documents may include non-character expressions such as figures and photographs, for example.

The attributes refer to items that are used to identify information desired to be obtained from the image 2. The attribute values for the attributes refer to the content for the respective attributes represented using the characters included in the image 2.

When a quotation image 2 is considered, by way of example, a user desires to obtain information such as what merchandise is quoted, how many pieces of merchandise are quoted, and what the quoted price is from the quotation image 2, and thus "merchandise name", "quantity", and "quoted price" are considered to be the attributes, for example. If the quotation image 2 includes information that represents the content for the attributes "merchandise name", "quantity", and "quoted price", e.g. "ballpoint pen", "2", and "200 yen", respectively, then "ballpoint pen", "2", and "200 yen" are considered to be the attribute values for "merchandise name", "quantity", and "quoted price", respectively.

The information processing apparatus 10 which extracts attribute values for attributes determined in advance from the image 2 includes functional sections including an image reception section 11, a user interface (UI) section 12, an image processing section 13, a control section 14, and an output section 15, storage regions including an optical character recognition (OCR) result database (DB) 16 and an extraction result DB 17, and rules including an extraction rule 18 and an association rule 19.

The image reception section 11 receives an image 2, from which attribute values are to be extracted, from an optical device such as a scanner that optically reads the content of a document and generates an image 2 of the document, for example, and delivers the received image 2 to the image processing section 13.

The UI section 12 receives an instruction, such as an instruction for the image reception section 11 to start reception of an image 2, for example, from an operator (hereinafter referred to as a "user") that attempts to extract attribute values for attributes from the image 2 using the information processing apparatus 10, and notifies the user of various kinds of information such as operation and the state of the information processing apparatus 10.

The image processing section 13 performs a process of extracting character information from the image 2 received by the image reception section 11, and extracting attribute values for a plurality of attributes determined in advance from the extracted character information. To that end, the image processing section 13 includes an OCR processing section 13A and an extraction section 13B.

The OCR processing section 13A performs image recognition known in the art on the received image 2, and converts a portion of the image 2 corresponding to characters into character codes. That is, the OCR processing section 13A allows the portion of the image 2 corresponding to characters to be handled as character information, which allows copying of the characters and searches from the characters. Hereinafter, the character information obtained from the image 2 by the OCR processing section 13A will be referred to as an "OCR result". The OCR processing section 13A stores the OCR result in the OCR result DB 16.

The extraction section 13B performs a process of extracting an attribute value for at least one attribute determined in advance from the OCR result stored in the OCR result DB 16 in accordance with the extraction rule 18 determined in advance, and correlating the attribute and the extracted attribute value.

Extraction methods known in the art such as a key-value extraction method and a character pattern extraction method, for example, are used to extract an attribute value for an attribute from the OCR result.

Figure 2A:
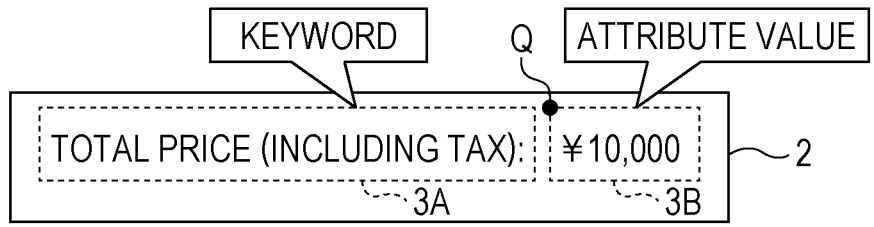
FIGS. 2A and 2B each illustrate an example of extraction methods known in the art to extract an attribute value for an attribute from an OCR result.
Figure 2B:
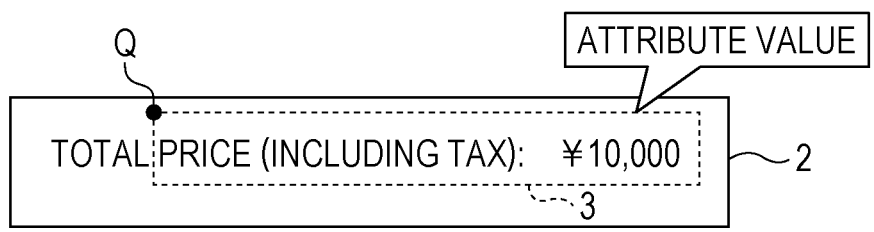

FIGS. 2A and 2B each illustrate an example of the extraction methods known in the art to extract an attribute value for an attribute from an OCR result. FIG. 2A illustrates an example of extraction by the key-value extraction method. FIG. 2B illustrates an example of extraction by the character pattern extraction method.

In the key-value extraction method, an attribute value (corresponding to the "value") for an attribute is extracted from an image 2 using a keyword (corresponding to the "key") that prescribes in advance for each attribute what character string represents the attribute in the image 2 and information on the relative position defined with reference to the keyword. If the attribute is the total price including tax, for example, the extraction section 13B extracts an attribute value for the attribute using an extraction rule 18 that prescribes that the total price including tax is expressed as "total price (including tax)" in the image 2 and that the total price including tax is indicated at the right of "total price (including tax)".

If the image 2 includes a portion (portion represented by a frame 3A) that indicates "total price (including tax)", as illustrated in FIG. 2A, the extraction section 13B extracts a character string (character string "¥10,000" represented by a frame 3B) indicated at the right of "total price (including tax)" as an attribute value for the attribute of the total price including tax in accordance with the extraction rule 18, and correlates the character string with the attribute.

In the character pattern extraction method, an attribute value for an attribute is extracted from an image 2 using an extraction rule 18 that prescribes in advance for each attribute the characteristic of a character string that represents the attribute value in the image 2. Examples of the characteristic of a character string that is used to indicate the attribute value include a character string that ends with "Inc." or "Co. Ltd." for a character string that represents a company name, and a character string that includes numerals for a character string that represents a price. Regular expressions are used to express character string patterns that prescribe the characteristic of such character strings, for example.

If the extraction rule 18 prescribes a character string pattern "price¥((incl. tax|including tax|incl. consumption tax|including consumption tax)¥).*(¥d{1,3}(,¥d{3})*) (yen|-|¥.-|)", for example, the extraction section 13B extracts a character string "total (including tax): ¥10,000" represented in a frame 3 from the image 2 illustrated in FIG. 2B, and correlates the extracted character string as an attribute value for the attribute "total price including tax".

In the case where an attribute value is to be correlated with an attribute, the extraction section 13B may correlate not only a character string that represents an attribute value, but also a coordinate value of the character string extracted as an attribute value in the image 2, with the attribute. The coordinate value of a character string in the image 2 is a coordinate value in a two-dimensional coordinate system with an origin P located at any position in the image 2, and may be represented by the coordinate value of the upper left vertex of the rectangular frame 3 and frame 3B which surround a character string that represents an attribute value, such as a point Q indicated in FIGS. 2A and 2B, for example. The coordinate value of an attribute value is not limited to that of the upper left vertex of the frame 3 and the frame 3B. The coordinate value of an attribute value may be that of any location of the frame 3 and the frame 3B as long as the position of a character string that represents the attribute value in the image 2 may be identified. Alternatively, the coordinate value of an attribute value may be that of any location of a character string that represents the attribute value, e.g. the center coordinate of a leading character, rather than a position on the frame 3 and the frame 3B, for example. The term "character string" as used herein refers to a series of one or more characters.

The extraction section 13B stores an extraction result in which extracted attribute values are correlated with respective attributes, that is, an attribute value extraction result 30, in the extraction result DB 17. The attribute value extraction result 30 will be described in detail later with reference to FIG. 7.

The control section 14 performs control so as to associate an attribute value for a sub attribute with a different attribute when attribute values for respective attributes determined in advance are extracted from the image 2 by the image processing section 13. The term "sub attribute" refers to an attribute for which an attribute value has been extracted from the image 2 and which supplements the content for a different attribute.

Figure 3:
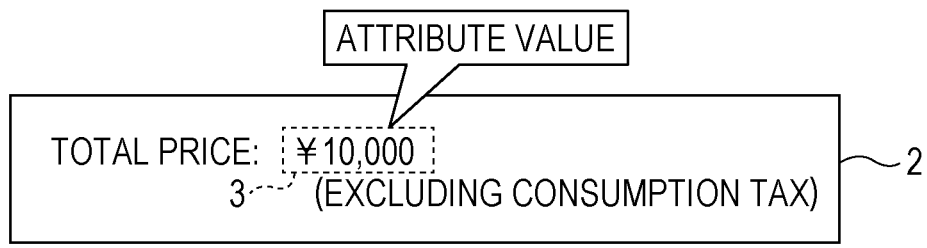
FIG. 3 illustrates an example in which an attribute value for a sub attribute may not be extracted from an OCR result.

FIG. 3 illustrates an example of an attribute value for an attribute "quoted price" extracted from the image 2 by the extraction section 13B using the character pattern extraction method. In the example of the image 2 illustrated in FIG. 3, a character string "excluding consumption tax" is indicated in a line that is different from the line in which the total price is indicated. Thus, a character string "excluding consumption tax" may not be extracted as a part of an attribute value for the "quoted price" using an extraction rule 18 configured to extract an attribute value from only the same line as the total price is indicated, for example.

In this manner, in the case where only a value "10,000 yen" is extracted from the image 2 as an attribute value for the attribute "quoted price" by the extraction section 13B, for example, it is not clear whether the attribute value for the "quoted price" includes tax or does not include tax. If an attribute value "excluding consumption tax" has been correlated with an attribute "consumption tax information" using another extraction rule 18 that is different from the extraction rule 18 to extract an attribute value for the "quoted price", on the other hand, it is understood that "10,000 yen" as an attribute value for the "quoted price" is a price excluding tax by associating an attribute value for "consumption tax information" with the attribute "quoted price". In this case, the "consumption tax information" is an attribute that supplements the content of the quoted price, and therefore is a sub attribute for the attribute "quoted price".

Association between an attribute value for a sub attribute and a different attribute is made in accordance with the association rule 19 prescribed in advance. The association rule 19 will be described in detail later.

In this manner, the control section 14 performs control so as to associate an attribute value for a sub attribute with a different attribute included in the attribute value extraction result 30 in accordance with the association rule 19 for associating an attribute value for a sub attribute with a different attribute. The control section 14 reflects the association result of associating a sub attribute with an attribute in the attribute value extraction result 30 stored in the extraction result DB 17. Hereinafter, the attribute value extraction result 30 in which the association result of associating a sub attribute with an attribute has been reflected will be referred to as an "attribute association result 32". The attribute association result 32 will be described in detail later with reference to FIG. 9.

The output section 15 outputs the attribute association result 32 stored in the extraction result DB 17 in accordance with an instruction from the control section 14. Outputting the attribute association result 32 corresponds to allowing the attribute association result 32 to be checked by the user. Thus, the attribute association result 32 may be output by any of transmitting the attribute association result 32 to an external device by way of a communication line, displaying the attribute association result 32 on a display, printing the attribute association result 32 on a recording medium such as paper using an image forming apparatus, and storing the attribute association result 32 in a storage device that the user is authorized to read, for example.

Figure 4:
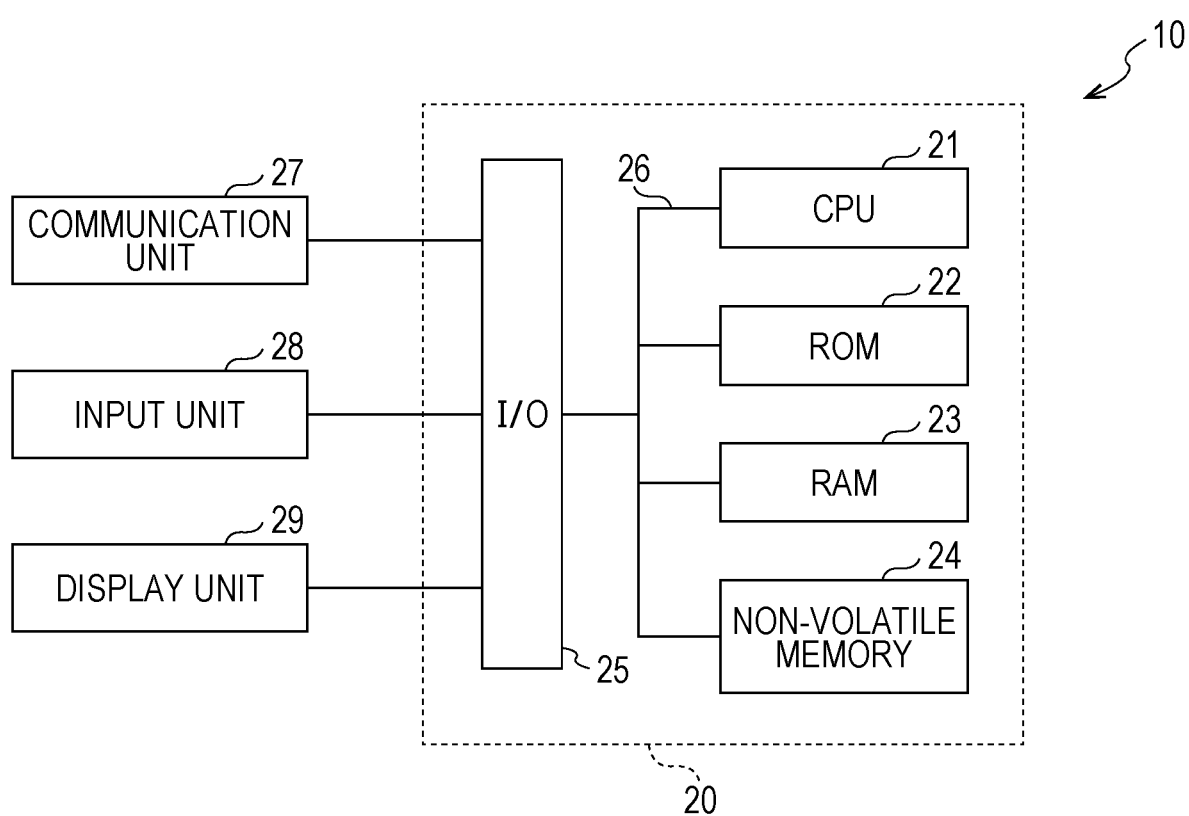
FIG. 4 illustrates an example of the configuration of an electrical system of the information processing apparatus.

The information processing apparatus 10 illustrated in FIG. 1 is constituted using a computer 20, for example. FIG. 4 illustrates an example of the configuration of an electrical system of the image forming apparatus 20 which is constituted using the computer 20.

The computer 20 includes a central processing unit (CPU) 21 that serves as the various functional sections of the information processing apparatus 10 illustrated in FIG. 1, a read only memory (ROM) 22 that stores an information processing program to be executed by the CPU 21, a random access memory (RAM) 23 that is used as a temporary work area for the CPU 21, a non-volatile memory 24, and an input/output interface (I/O) 25. The CPU 21, the ROM 22, the RAM 23, the non-volatile memory 24, and the I/O 25 are connected to each other via a bus 26.

The non-volatile memory 24 is an example of a storage device that keeps stored information even if power supplied to the non-volatile memory 24 is blocked. While a semiconductor memory is used as an example of the non-volatile memory 24, a hard disk may also be used. It is not necessary that the non-volatile memory 24 should be built in the computer 20, and the non-volatile memory 24 may be a storage device that is removably mountable to the computer 20 such as a memory card, for example. The OCR result DB 16 and the extraction result DB 17 are constructed in the non-volatile memory 24, for example.

A communication unit 27, an input unit 28, and a display unit 29, for example, are connected to the I/O 25.

The communication unit 27 is connected to a communication line, and includes a communication protocol for communication with an external device such as a storage device and a computer connected to the same communication line.

The input unit 28 is a device that notifies the CPU 21 of an instruction received from the user, and may be a button, a touch screen, a keyboard, a mouse, etc., for example. The information processing apparatus 10 executes a function specified by the user via the input unit 28.

The display unit 29 is a device that displays information processed by the CPU 21 as an image, and may be a liquid crystal display, an organic electro luminescence (EL) display, a projector that projects a video to a screen, etc., for example.

The input unit 28 and the display unit 29 operate in conjunction with the UI section 12 illustrated in FIG. 1 to receive various instructions from the user and notify the user of various kinds of information about operation and the state of the information processing apparatus 10.

Units to be connected to the I/O 25 are not limited to the units illustrated in FIG. 4. For example, a scanner unit that optically reads the content of a document placed on platen glass and that converts the content of the document into an image may be connected to the I/O 25. In this case, the CPU 21 receives the image 2 of the document from the scanner unit by way of the I/O 25.

In the case where a scanner unit is not connected to the I/O 25, the information processing apparatus 10 may receive the image 2 from an external device through the communication unit 27, for example. Alternatively, the information processing apparatus 10 may receive the image 2 from a storage device that is removably mountable to the computer 20 such as a memory card.

Next, the function of the information processing apparatus 10 to associate attribute values for respective associated attributes, such as an attribute about the price and an attribute about the consumption tax, even if such attribute values are individually extracted from the image 2, will be described.

Here, an association process to associate an attribute value for a sub attribute with an associated attribute will be described using an example in which attribute values for respective associated attributes are to be associated using a quotation image 2A illustrated in FIG. 5.

Figure 6:
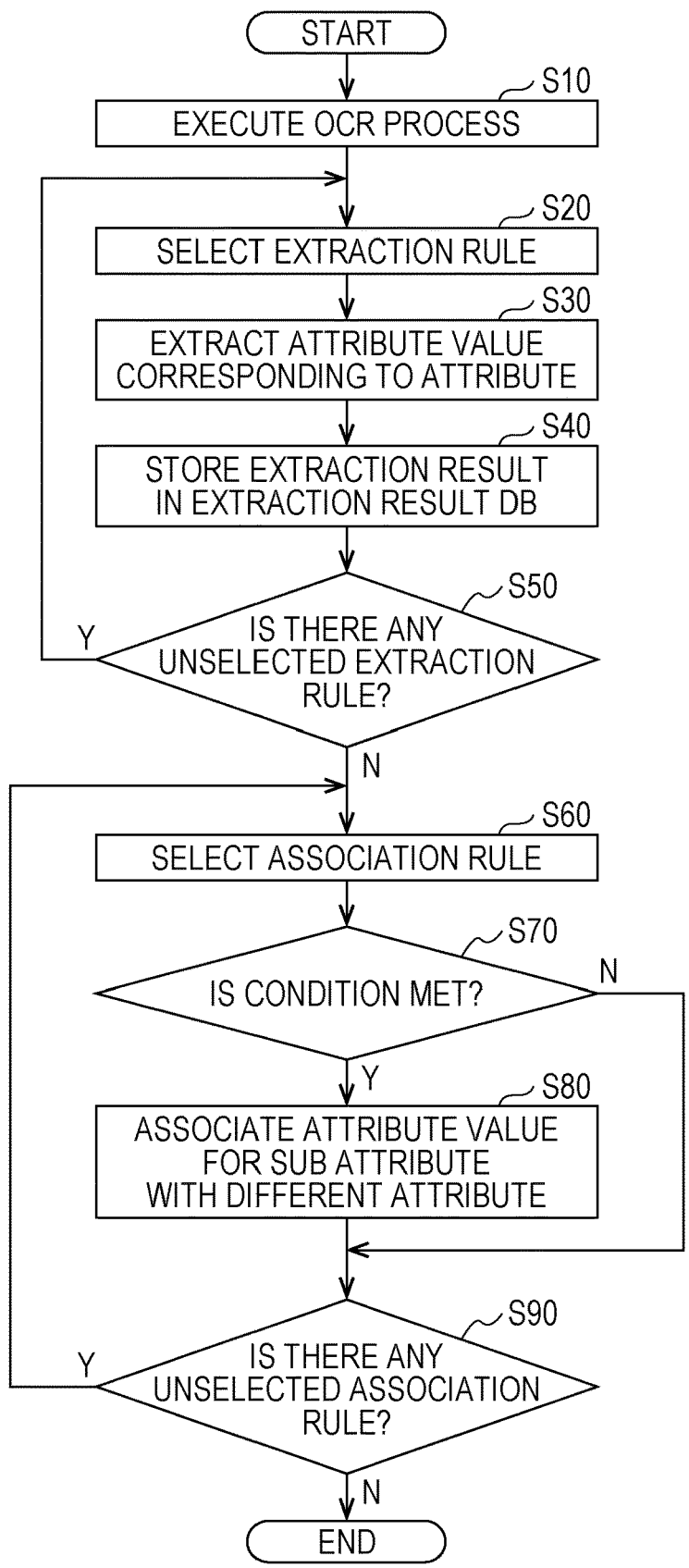
FIG. 6 is a flowchart illustrating an example of the flow of an association process.

FIG. 6 is a flowchart illustrating an example of the flow of an association process executed by the CPU 21 in the case where the quotation image 2A illustrated in FIG. 5 has been received from an external device through the communication unit 27. The information processing program which prescribes the association process is stored in advance in the ROM 22 of the information processing apparatus 10, for example. The CPU 21 of the information processing apparatus 10 reads the information processing program stored in the ROM 22, and executes the association process.

First, in step S10, the CPU 21 performs image recognition known in the art on the image 2A, generates an OCR result by converting a portion of the image 2A corresponding to characters into character codes, and stores the OCR result in the OCR result DB 16 constructed in the non-volatile memory 24.

In step S20, the CPU 21 selects one extraction rule 18 from among at least one or more extraction rules 18 stored in advance in the non-volatile memory 24. For convenience of description, the extraction rule 18 selected in step S20 will be represented as a "selected extraction rule 18".

In step S30, the CPU 21 extracts an attribute value for an attribute specified by the selected extraction rule 18 from the OCR result for the image 2A stored in the OCR result DB 16 in accordance with the selected extraction rule 18.

In step S40, the CPU 21 stores the attribute value extracted from the OCR result for the image 2A in accordance with the selected extraction rule 18 in step S30 in the extraction result DB 17, which is constructed in the non-volatile memory 24, in correlation with the attribute for which the attribute value is extracted.

In step S50, the CPU 21 determines whether or not there is any unselected extraction rule 18 that has not been selected in step S20, among the extraction rules 18 stored in advance in the non-volatile memory 24. In the case where there is any unselected extraction rule 18, the process proceeds to step S20, and any one extraction rule 18 is selected as a new selected extraction rule 18 from among the unselected extraction rules 18.

By repeatedly executing steps S20 to S50 until it is determined in the determination process in step S50 that there is no unselected extraction rule 18, the attribute value extracted from the image 2A is correlated with the attribute for which the attribute value is extracted in the respective extraction rules 18, and the attribute value extraction result 30 is stored in the extraction result DB 17.

The process proceeds to step S60 in the case where it is determined in the determination process in S50 that there is no unselected extraction rule 18.

FIG. 7 illustrates an example of the attribute value extraction result 30 stored in the extraction result DB 17. The attribute value extraction result 30 illustrated in FIG. 7 includes attributes "price", "total", "incl. tax", "excl. tax", "consumption tax rate", "multiplication rate", "net price", and "consumption tax information", for example, so as to correspond to the content of the quotation image 2A illustrated in FIG. 5.

In the quotation image 2A illustrated in FIG. 5, the total price field includes "¥400,000", the multiplication rate field includes "80%", the price field includes "500,000", the remarks field "1)" includes "The consumption tax is not included in the quoted price.", and the remarks field "2)" includes "The consumption tax rate is 10%." Thus, attribute values "¥400,000", "10%", "80%", "500,000", and "The consumption tax is not included" are correlated with the attributes "total", "consumption tax rate", "multiplication rate", "net price", and "consumption tax information", respectively, in accordance with the extraction rule 18.

As described already, not only attribute values but also coordinate values of the attribute values may be correlated with the attributes. In the attribute value extraction result 30 illustrated in FIG. 7, attribute values and coordinate values of the attribute values are correlated with the attributes.

In the case where there is any attribute for which an attribute value was not extracted using the extraction rule 18 prescribed in advance, among the attributes included in the attribute value extraction result 30, the attribute value for the attribute is left blank. Thus, in the attribute value extraction result 30 illustrated in FIG. 7, attribute values for the attributes "incl. tax" and "excl. tax" were not extracted using any extraction rule 18 prescribed in advance, and therefore the attribute values for the attributes "incl. tax" and "excl. tax" are left blank.

This arises in the case where a character string that represents whether the total price in the quotation image 2A illustrated in FIG. 5 includes tax or does not include tax is not provided at a position specified by the extraction rule 18, or is represented by a character string that is different from a character string pattern specified by the extraction rule 18, or the quotation image 2A does not include information that indicates whether the total price includes tax or does not include tax in the first place.

As illustrated in FIG. 7, the attribute value extraction result 30 is represented by a data structure that manages associated attributes in a hierarchical manner. For example, the level that is subordinate to the "price" which is located at the uppermost level, i.e. root, of the data structure is associated with the attributes "total", "consumption tax rate", "multiplication rate", "net price", and "consumption tax information" as sub attributes. Further, the level that is subordinate to the "total" is associated with two attributes "incl. tax" and "excl. tax" as sub attributes.

The CPU 21 is able to acquire the detailed content for attributes located at superordinate levels by following a line, i.e. "link", that connects between associated attributes in the attribute value extraction result 30. For example, in the attribute value extraction result 30 in FIG. 7, the attribute value "¥400,000" obtained by following a link from "price" to "total" represents the total quoted price. Meanwhile, the attribute value "10%" obtained by following a link from "price" to "consumption tax rate" represents the consumption tax rate to be applied to the price.

Since the attribute values for the attributes "incl. tax" and "excl. tax" in the attribute value extraction result 30 illustrated in FIG. 7 are left blank, however, it is not clear whether the total price "¥400,000" obtained by following a link from "price" to "total" indicates a total price including tax or a total price not including tax.

Thus, in step S60 in FIG. 6, the CPU 21 selects any one association rule 19 from among at least one or more association rules 19 stored in advance in the non-volatile memory 24. For convenience of description, the association rule 19 selected in step S60 will be represented as a "selected association rule 19".

FIG. 8 illustrates an example of the association rule 19. The association rule 19 includes a condition for determining whether or not attributes are to be associated with each other, and association information that prescribes how and what attributes are to be associated with each other in the case where the condition is met.

In the association rule 19 in FIG. 8, a portion "if coordinate of [price–consumption tax information] is included in one-third from lower part of image and attribute value for [price–consumption tax information] includes [consumption tax] and [is not included]," indicates the condition, and a portion "attribute value for [price–total] is rendered as attribute value for [price–total–excl. tax]" indicates the association information.

The attribute [price–consumption tax information] supplements the content for the attribute as to whether the price correlated with the attribute [price–total] does not include tax or includes tax, and thus is a sub attribute for the attribute [price–total].

Even if the attribute value for an attribute (in this case, [price–total]), the content for which is supplemented by a sub attribute (in this case, [price–consumption tax information]), and the attribute value for the sub attribute are in a positional relationship not assumed in the extraction rule 18, or are at distant locations not assumed in the extraction rule 18, since the condition of the association rule 19 specifies where in the quotation image 2A the sub attribute is located, that is, a position condition that prescribes the position of the attribute value for the sub attribute, it is occasionally possible to identify the sub attribute corresponding to the attribute, the content for which is to be supplemented, from the image 2A.

In other words, the association rule 19 allows the attribute value for a sub attribute positioned so as not to be extracted from the quotation image 2A using the extraction rule 18 to be associated with an attribute, the content for which is to be supplemented by the sub attribute. The attribute, the content for which is to be supplemented by the sub attribute, is an example of the "different attribute" according to the present disclosure.

The condition that "coordinate of [price–consumption tax information] is included in one-third from lower part of image" is set in the association rule 19 indicated in FIG. 8 because information about the consumption tax is often given in a remarks field and the remarks field is often provided at the end of a quotation. It is possible to determine whether or not the coordinate of [price–consumption tax information] is included in one-third from the lower part of the image from a coordinate value correlated with the attribute value for [price–consumption tax information].

Similarly, even if the attribute value for a sub attribute is represented using an expression not assumed in the extraction rule 18 since the condition of the association rule 19 specifies what character string is included as the attribute value for the sub attribute, that is, a character string condition that prescribes the content of the attribute value for the sub attribute, it is occasionally possible to identify the sub attribute corresponding to the attribute, the content for which is to be supplemented, from the image 2A.

It is not necessary that both a position condition and a character string condition should be prescribed in the condition of the association rule 19, and it is only necessary that at least one of a position condition and a character string condition should be prescribed. A condition that is different from a position condition and a character string condition may be prescribed as the condition of the association rule 19. In the case where a character string that represents the attribute value for a sub attribute includes a characteristic about the appearance of characters, that is, a characteristic about characters, such as size, font, and color, for example, it is occasionally possible to identify the sub attribute corresponding to the attribute, the content for which is to be supplemented, from the image 2A by prescribing a character condition that prescribes the characteristic of characters in the condition of the association rule 19.

While the condition of the association rule 19 is prescribed by the user, the CPU 21 may correct the condition of the association rule 19. For example, the CPU 21 may identify the position of a remarks field in the image 2A from the position of a character string that includes "Remarks", and correct the condition of the association rule 19 such that the range of the coordinate of [price–consumption tax information] prescribed in the condition of the association rule 19 includes a coordinate corresponding to the identified position of the remarks field. In this case, the condition of the association rule 19 is met even in the case where the attribute value for the attribute (e.g. [price–consumption tax information]) specified in the condition of the association rule 19 is indicated in the image 2A but the attribute value for the specified attribute is indicated at a location other than the position specified in the condition (e.g. "one-third from lower part of image").

The association information of the association rule 19 is information that prescribes how an attribute, the content for which is to be supplemented, and a sub attribute corresponding to the attribute are to be associated with each other in the case where the condition of the association rule 19 is met and the sub attribute corresponding to the attribute, the content for which is to be supplemented, is identified from the image 2A.

In the example of the association information in the association rule 19 indicated in FIG. 8, it is attempted to clearly indicate that the price correlated with the attribute [price–total] does not include tax by prescribing an instruction to set the attribute value [price–total] to the attribute value [price–total–excl. tax] in order to associate the attribute value [price–consumption tax information], which is identified as a sub attribute, with the attribute [price–total].

While the association rule 19 indicated in FIG. 8 is prescribed using a natural language such as Japanese and English, the method of prescribing the association rule 19 is not limited thereto. For example, the association rule 19 may be prescribed using an artificial language such as programming languages and regular expressions known in the art. The association rule 19 is expressed clearly by using an artificial language, rather than by using a natural language, since there is less ambiguity in the prescribed content. As a matter of course, the association rule 19 may be prescribed using a unique artificial language that is used exclusively for the information processing apparatus 10.

In step S70 in FIG. 6, the CPU 21 determines whether or not the condition of the selected association rule 19 is met. In the case where the condition of the selected association rule 19 is met, the process proceeds to step S80.

In step S80, the CPU 21 associates the attribute value for the sub attribute with the different attribute in accordance with the process prescribed in the association information of the selected association rule 19, since the condition of the selected association rule 19 is met, and proceeds to step S90.

Figure 9:
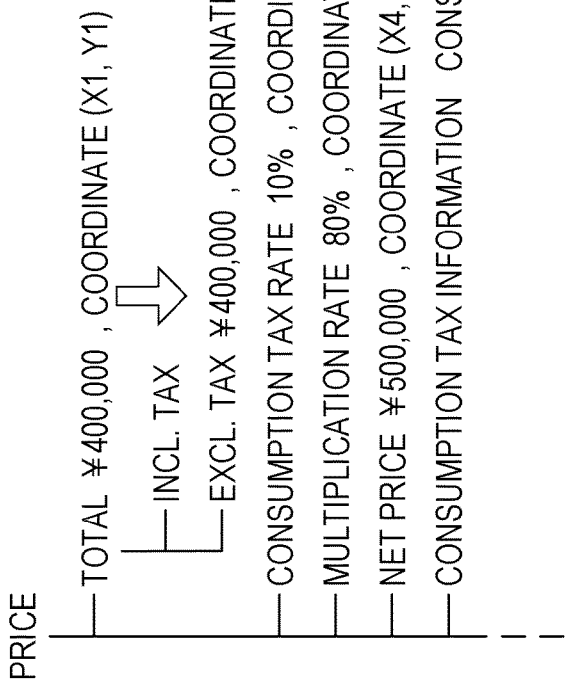
FIG. 9 illustrates an example of the result of extraction of attribute values in a quotation in which attributes have been associated with each other.

For example, if the association rule 19 indicated in FIG. 8 is selected as the selected association rule 19, the CPU 21 sets the attribute value for [price–total] in the attribute value extraction result 30 as the attribute value for [price–total–excl. tax]. Thus, in the case where the attribute value extraction result 30 before execution of step S80 is the attribute value extraction result 30 indicated in FIG. 7, "¥400,000" which is the attribute value for [price–total] is set as the attribute value for [price–total–excl. tax] as indicated in FIG. 9.

Thus, even if it is not clear from the attribute value for the total quoted price extracted from the OCR result for the image 2A using the extraction rule 18 alone whether the total price is a total price including tax or a total price not including tax, the CPU 21 is able to recognize that the total price is a total price not including tax by following a link in the attribute value extraction result 30 to [price–total–excl. tax], since the total price is associated as a total price not including tax using the association rule 19.

In the case where the coordinate value of an attribute value is correlated with an attribute, the CPU 21 may also associate the coordinate value of the attribute value with a different attribute, together with the attribute value, even if not clearly indicated so in the association information of the selected association rule 19.

In the case where it is determined in the determination process in step S70 that the condition of the selected association rule 19 is not met, on the other hand, the CPU 21 proceeds to step S90 without executing the process in step S80. That is, the CPU 21 does not associate the attributes with each other if the condition of the selected association rule 19 is not met.

In step S90, the CPU 21 determines whether or not there is any unselected association rule 19 that has not been selected in step S60, among the association rules 19 stored in advance in the non-volatile memory 24. In the case where there is any unselected association rule 19, the process proceeds to step S60, and any one association rule 19 is selected as a new selected association rule 19 from among the unselected association rules 19.

By repeatedly executing steps S60 to S90 until it is determined in the determination process in step S90 that there is no unselected association rule 19, the attributes are associated with each other in accordance with the association information included in each of the association rules 19, the condition of which is met. As a result, the attribute association result 32 obtained using the association rules 19 is stored in the extraction result DB 17.

The association process illustrated in FIG. 6 is ended in the case where it is determined in the determination process in S90 that there is no unselected association rule 19.

From what has been described above, it is possible for the information processing apparatus 10 to associate an attribute value for a sub attribute with an attribute to be supplemented later using the association rule 19 even in the case where the attribute value for the sub attribute may not be acquired together in association with an attribute value for the attribute to be supplemented using the extraction rule 18 prescribed in advance.

After the association process is ended, the CPU 21 outputs the attribute association result 32 in accordance with a form specified in an instruction to output the attribute association result 32 in the case where such an output instruction is received from the user through the input unit 28.

In the association process indicated in FIG. 6, the CPU 21 selects all the association rules 19 stored in advance in the non-volatile memory 24. However, the association process indicated in FIG. 6 may be ended, even if all the association rules 19 have not been selected, in the case where the attributes are completely associated with each other with attribute values associated with all the attributes included in the attribute value extraction result 30.

In the association process indicated in FIG. 6, the attributes are associated with each other in accordance with the association information of the association rule 19. If there is any attribute that is not prescribed in the association information of the association rule 19 but that may be associated newly after the attributes are associated with each other in accordance with the association information, however, the CPU 21 may associate an attribute value for a sub attribute with such an attribute.

Figure 10:
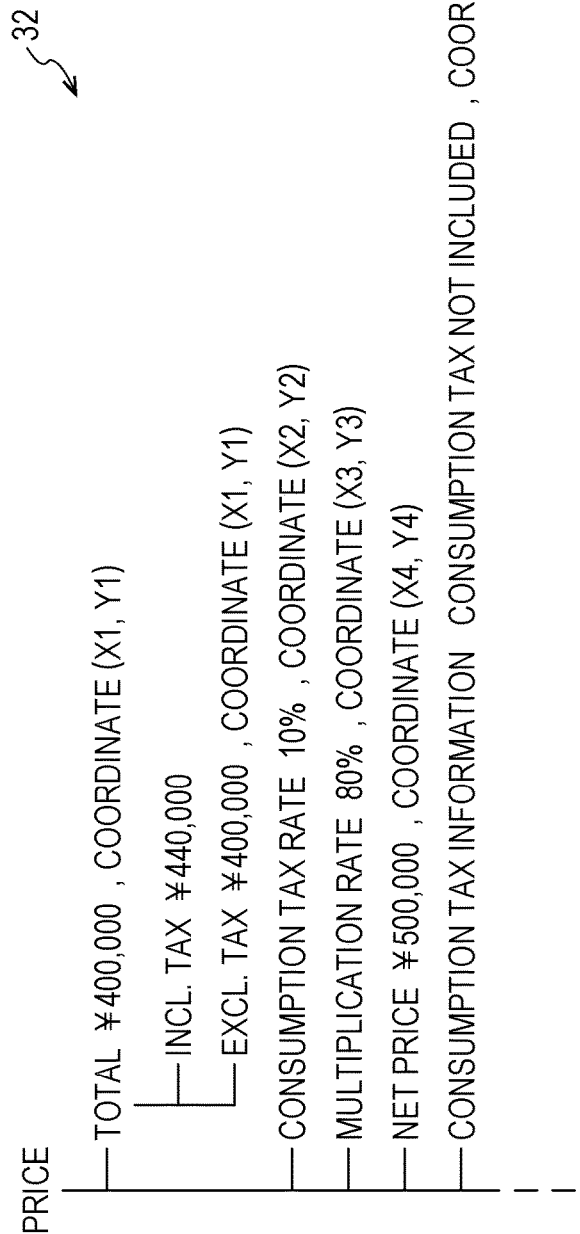
FIG. 10 illustrates an example of the result of extraction of attribute values in a quotation in which attribute values for associated sub attributes have been set.

For example, the attribute association result 32 in which "¥400,000" and the coordinate value of the attribute value are associated with the attribute "excl. tax" such as that in FIG. 9 is assumed. In this case, the CPU 21 recognizes from the attribute association result 32 indicated in FIG. 9 that the total price "¥400,000" is a total price excluding tax. In addition, the CPU 21 recognizes from the attribute association result 32 indicated in FIG. 9 that the consumption tax rate for the total price is "10%". Thus, the CPU 21 is able to calculate the total price including tax as "¥440,000" from the total price excluding tax and the consumption tax rate for the total price. Thus, as indicated in FIG. 10, the CPU 21 is able to set "¥440,000" to "price–total–incl. tax].

Even for an attribute which supplements the content of the total price and with which an attribute value is not correlated by any of the extraction rules 18, such as the attribute "incl. tax" in the attribute association result 32 indicated in FIG. 9, a total price including tax is determined uniquely by using a sub attribute for a price, namely "consumption tax rate", for the total price. An attribute for which an attribute value is not set using the extraction rule 18 or the association rule 19 but for which an attribute value is determined uniquely using an attribute value for an attribute that has been set already in this manner is referred to as an "associated sub attribute".

As seen from the fact that an attribute value for "incl. tax" in the attribute association result 32 indicated in FIG. 9 is not included in the quotation image 2A, the associated sub attribute may be an attribute for which an attribute value is not originally included in the document image 2. In addition, as a matter of course, the associated sub attribute may be an attribute for which an attribute value is included in the document image 2 but for which an attribute value was not correlated or associated using the extraction rule 18 or the association rule 19.

An invoice (qualified invoice) system is being introduced as a method to receive a tax deduction for the consumption tax purchase. The association process by the information processing apparatus 10 indicated in FIG. 6 is also used to associate attributes in the invoice.

The invoice refers to a billing statement in which a seller indicates to a buyer the applicable tax rate for each piece of merchandise and the total price for each tax rate. FIG. 11 illustrates an example of an invoice image 2B.

The invoice image 2B illustrated in FIG. 11 indicates the classification of the applicable tax rate and the tax-included price for each piece of merchandise indicated in the description field, and the total of the tax-included prices of the pieces of merchandise. In addition, the invoice image 2B illustrated in FIG. 11 individually indicates the total of the tax-included prices of merchandise to be subjected to a reduce tax rate (8%) and the total of the tax-included prices of merchandise to be subjected to a normal tax rate (10%), and indicates a note that "asterisk (*) indicates merchandise to be subjected to reduced tax rate (8%)" in the last line of the invoice image 2B.

Figure 12:
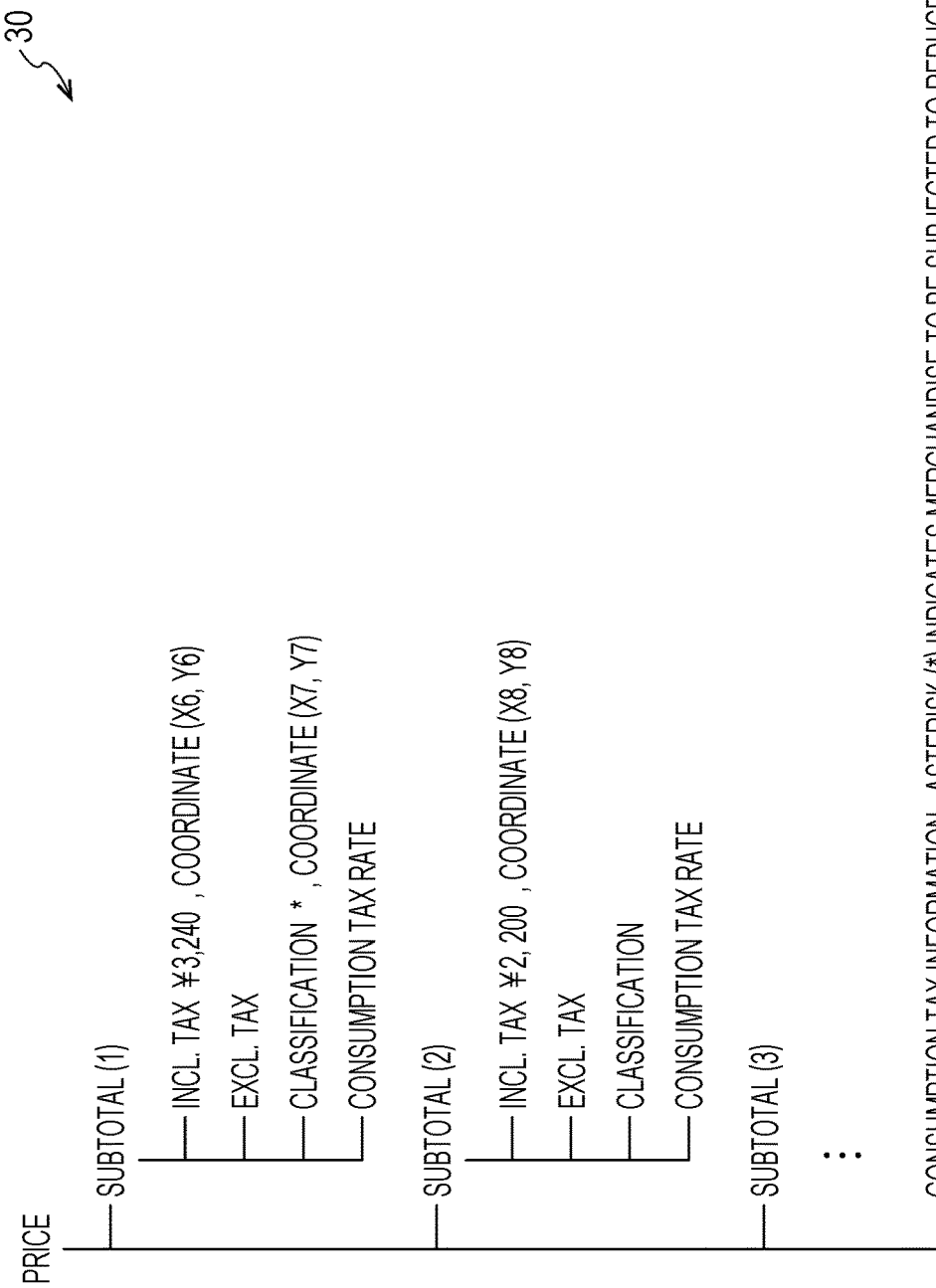
FIG. 12 illustrates an example of the result of extraction of attribute values from an OCR result for an invoice.

FIG. 12 illustrates an example of the attribute value extraction result 30 indicating the attribute values extracted from the OCR result for the invoice image 2B using the extraction rule 18 prescribed in advance in the case where the image 2B has been received by the information processing apparatus 10. In the attribute value extraction result 30 indicated in FIG. 12, subtotal (1), subtotal (2), . . . , and subtotal (N) are attributes corresponding to the price of each piece of merchandise indicated in the description field in the invoice image 2B in FIG. 11. "N" represents a natural number.

If the extraction rule 18 prescribes extracting an attribute value in the direction of the same line, no attribute values are correlated with the attributes "excl. tax" and "consumption tax rate" in the attribute value extraction result 30 indicated in FIG. 12, since numerical values that represent the tax-excluded price and the consumption tax rate are not indicated in the line in which the price of each piece of merchandise is indicated. On the other hand, attribute values are correlated with the attributes "incl. tax" and "classification" in the attribute value extraction result 30 indicated in FIG. 12, since a tax-included price and a symbol that represents the classification of the consumption tax rate are indicated in the line in which the price of each piece of merchandise is indicated. In the attribute value extraction result 30 indicated in FIG. 12, an attribute value for the attribute [price–subtotal (2)–classification] is not seemingly set, for example. This is because the classification field for stationery in the invoice image 2B in FIG. 11 is left blank. Thus, an attribute value that conforms to the content of the classification field in the invoice image 2B in FIG. 11 is set in the attribute [price–subtotal (2)–classification].

A note that "asterisk (*) indicates merchandise to be subjected to reduced tax rate (8%)" is indicated in the last line of the invoice image 2B. Therefore, "asterisk (*) indicates merchandise to be subjected to reduced tax rate (8%)" is correlated with the attribute "consumption tax information" using the extraction rule 18.

As described already, not only attribute values but also coordinate values of the attribute values may be correlated with the attributes. In the attribute value extraction result 30 illustrated in FIG. 12, attribute values and coordinate values of the attribute values are correlated with the attributes.

On the other hand, it is assumed that two association rules 19 indicated in FIG. 13 are prepared for the attribute value extraction result 30 illustrated in FIG. 12 and extracted from the invoice image 2B in FIG. 11 in accordance with the extraction rule 18.

For convenience of description, one of the association rules 19 is represented as a "first association rule 19A", and the other association rule 19 is represented as a "second association rule 19B".

In the first association rule 19A, a portion "if coordinate of [price–consumption tax information] is included in one-third from lower part of image, attribute value for [price–consumption tax information] includes '*' and 'reduced tax rate', and [price–subtotal (N)–classification] includes '*'," indicates the condition, and a portion "[price–subtotal (N)–consumption tax rate] is rendered '8%'." indicates the association information.

In the second association rule 19B, meanwhile, a portion "if coordinate of [price–consumption tax information] is included in one-third from lower part of image, attribute value for [price–consumption tax information] includes '*' and 'reduced tax rate', and [price–subtotal (N)–classification] does not include '*'," indicates the condition, and a portion "[price–subtotal (N)–consumption tax rate] is rendered '10%'." indicates the association information.

In the invoice image 2B illustrated in FIG. 11, an attribute value for the attribute "price–consumption tax rate" is indicated in the last line of the invoice image 2B, and the attribute value for the attribute "price–consumption tax rate" includes character strings "*" and "reduced tax rate". In addition, the attribute value for "price–subtotal (1)–classification" is "*", and thus the condition of the first association rule 19A is met for the attribute [price–subtotal (1)]. Thus, "8%" is set as the attribute value for the attribute [price–subtotal (1)–consumption tax rate] in accordance with the association information on the first association rule 19A.

On the other hand, the attribute value for "price–subtotal (2)–classification" is not "*", and thus the condition of the second association rule 19B is met for the attribute [price–subtotal (2)]. Thus, "10%" is set as the attribute value for the attribute [price–subtotal (2)–consumption tax rate] in accordance with the association information on the second association rule 19B.

FIG. 14 illustrates an example of the attribute association result 32 for a case where the association process illustrated in FIG. 6 is executed by applying the first association rule 19A and the second association rule 19B indicated in FIG. 13 to the attribute value extraction result 30 indicated in FIG. 12. As illustrated in FIG. 14, the consumption tax rate to be applied is set for each piece of merchandise also to the attribute "consumption tax rate", for which an attribute value was not correlated using the extraction rule 18 alone, as a result of associating the attributes "classification" and "consumption tax information" with each other by applying the association rules 19.

As described already, the CPU 21 may set an attribute value for an associated sub attribute from the attribute association result 32 also in the invoice image 2B. FIG. 15 illustrates an example of setting an attribute value for the attribute "excl. tax" from the attribute association result 32 indicated in FIG. 14. The CPU 21 is able to set an attribute value for the attribute "excl. tax" from "tax-included price" and "consumption tax rate".

While an aspect of the information processing apparatus 10 has been described above using an exemplary embodiment, the disclosed aspect of the information processing apparatus 10 is exemplary, and the aspect of the information processing apparatus 10 is not limited to the scope of description of the exemplary embodiment. A variety of modifications and alterations may be made to the exemplary embodiment without departing from the scope and spirit of the present disclosure. Such modified or altered forms also fall within the technical scope of the present disclosure. For example, the order of the steps of the association process indicated in FIG. 6 may be changed without departing from the scope and spirit of the present disclosure.

In the exemplary embodiment described above, the association process is implemented using software, by way of example. However, a process that is equivalent to the association process indicated in FIG. 6 may be implemented using hardware.

In the embodiment above, the term "processor" refers to hardware in a broad sense. Examples of the processor include general processors (e.g., the CPU 21) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

In the exemplary embodiment described above, the information processing program is stored in the ROM 22. However, the location of storage of the information processing program is not limited to the ROM 22. The information processing program according to the present disclosure may be provided as stored in a storage medium that is readable by the computer 20. For example, the information processing program may be provided as stored in an optical disk such as a compact disk read only memory (CD-ROM) and a digital versatile disk read only memory (DVD-ROM). Alternatively, the information processing program may be provided as stored in a portable semiconductor memory such as a Universal Serial Bus (USB) memory and a memory card.

The ROM 22, the non-volatile memory 24, the CD-ROM, the DVD-ROM, the USB memory, and the memory card are examples of a non-transitory storage medium.

Further, the information processing apparatus 10 may download the information processing program from an external device connected to the communication unit 27 through a communication line, and store the downloaded information processing program in the non-transitory storage medium. In this case, the CPU 21 of the information processing apparatus 10 reads from the non-transitory storage medium the information processing program downloaded from the external device, and executes the association process.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
extract attribute values for a plurality of attributes from an optical character recognition (OCR) result for an image in accordance with an extraction rule determined in advance, and generate an extraction result in which the extracted attribute values and the respective attributes are correlated with each other; and
perform control so as to associate, in accordance with an association rule for associating an attribute value for a sub attribute with a different attribute, the attribute value for the sub attribute with the different attribute included in the extraction result, the sub attribute being an attribute for which an attribute value is extracted from the image and which supplements a content for the different attribute,
wherein the association rule includes a condition for performing association and association information that prescribes how the different attribute and the sub attribute are to be associated with each other, and
wherein the processor is configured to perform control so as to associate the attribute value for the sub attribute with the different attribute in accordance with the association information in a case where the condition is met.

2. The information processing apparatus according to claim 1,
wherein the condition includes a content that prescribes at least one of a position of the attribute value for the sub attribute in the image and a content of the attribute value for the sub attribute.

3. The information processing apparatus according to claim 1,
wherein the processor is configured to perform control so as to also associate an attribute value for an associated sub attribute with the different attribute in a case where the sub attribute is associated with the different attribute, the associated sub attribute being an attribute that supplements the content for the different attribute as with the sub attribute, and an attribute value for the associated sub attribute being not correlated using the extraction rule but being determined uniquely using the attribute value for the sub attribute.

4. The information processing apparatus according to claim 2,
wherein the processor is configured to perform control so as to also associate an attribute value for an associated sub attribute with the different attribute in a case where the sub attribute is associated with the different attribute, the associated sub attribute being an attribute that supplements the content for the different attribute as with the sub attribute, and an attribute value for the associated sub attribute being not correlated using the extraction rule but being determined uniquely using the attribute value for the sub attribute.

5. The information processing apparatus according to claim 3,
wherein the associated sub attribute is an attribute for which the attribute value is not included in the image.

6. The information processing apparatus according to claim 4,
wherein the associated sub attribute is an attribute for which the attribute value is not included in the image.

7. The information processing apparatus according to claim 1,
wherein the extraction result is represented by a data structure that manages associated attributes in a hierarchical manner.

8. The information processing apparatus according to claim 2,
wherein the extraction result is represented by a data structure that manages associated attributes in a hierarchical manner.

9. The information processing apparatus according to claim 3,
wherein the extraction result is represented by a data structure that manages associated attributes in a hierarchical manner.

10. The information processing apparatus according to claim 4,
wherein the extraction result is represented by a data structure that manages associated attributes in a hierarchical manner.

11. The information processing apparatus according to claim 5,
wherein the extraction result is represented by a data structure that manages associated attributes in a hierarchical manner.

12. The information processing apparatus according to claim 1,
wherein the attribute value for the sub attribute is an attribute value located at a position at which the attribute value is not extracted as an attribute value for the different attribute even if extracted from the image in accordance with the extraction rule.

13. An information processing method comprising:
extracting attribute values for a plurality of attributes from an optical character recognition (OCR) result for an image in accordance with an extraction rule determined in advance, and generate an extraction result in which the extracted attribute values and the respective attributes are correlated with each other; and
executing control so as to associate, in accordance with an association rule for associating an attribute value for a sub attribute with a different attribute, the attribute value for the sub attribute with the different attribute included in the extraction result, the sub attribute being an attribute for which an attribute value is extracted from the image and which supplements a content for the different attribute,
wherein the association rule includes a condition for performing association and association information that prescribes how the different attribute and the sub attribute are to be associated with each other, and
wherein the attribute value for the sub attribute is associated with the different attribute in accordance with the association information in a case where the condition is met.

14. A non-transitory computer readable medium storing a program causing a computer to execute process for information processing, the process comprising:
extracting attribute values for a plurality of attributes from an optical character recognition (OCR) result for an image in accordance with an extraction rule determined in advance, and generating an extraction result in which the extracted attribute values and the respective attributes are correlated with each other; and
executing control so as to associate, in accordance with an association rule for associating an attribute value for a sub attribute with a different attribute, the attribute value for the sub attribute with the different attribute included in the extraction result, the sub attribute being an attribute for which an attribute value is extracted from the image and which supplements a content for the different attribute,
wherein the association rule includes a condition for performing association and association information that prescribes how the different attribute and the sub attribute are to be associated with each other, and
wherein the attribute value for the sub attribute is associated with the different attribute in accordance with the association information in a case where the condition is met.

* * * * *